Sept. 11, 1956     G. W. ONKSEN ET AL     2,762,912

LENS

Filed Jan. 24, 1951             2 Sheets-Sheet 1

Inventors
George W. Onksen,
John W. Cole &
Raymond O. Gaither
By Willits, Helwig & Baillio
Attorneys

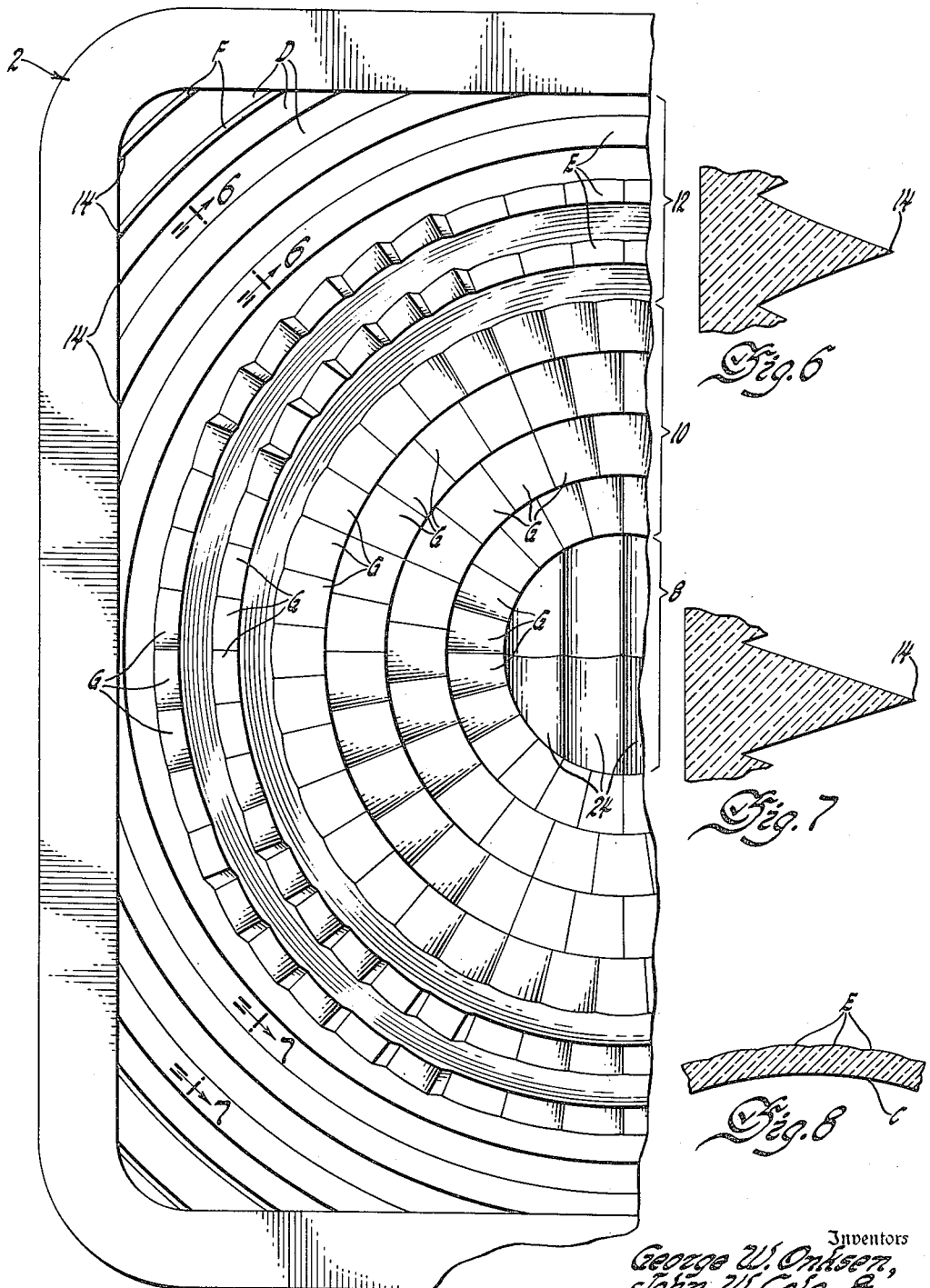

United States Patent Office 2,762,912
Patented Sept. 11, 1956

2,762,912
LENS

George W. Onksen, Anderson, John W. Cole, Markleville, and Raymond A. Gaither, Pendleton, Ind., assignors to General Motors Corporation, Detroit, Mich., a corporation of Delaware Application January 24, 1951, Serial No. 207,558

6 Claims. (Cl. 240—106.1)

The present invention relates to lenses and more particularly to lenses for use in automotive vehicle lamps such as tail lamps where it is considered desirable to provide a light beam of uniform and optimum intensity to attract the attention of other vehicle operators.

Such lenses are generally characterized by dioptric and catadioptric lens portions serving by refraction and internal reflection to concentrate light along the axis of the lens. While concentration of the light is important it is also considered desirable that such lenses provide an optimum degree of controlled angular dispersion of the light so that an observer laterally displaced from the axis of the lens will be in the path of the beam of light transmitted by the lens. Heretofore, lenses of this type have not been entirely satisfactory because of the inability of such lenses to provide beam patterns of substantially uniform density and because of failure to utilize substantially all of the lens for controlled light transmission.

Accordingly, it is an object of the present invention to provide an improved automotive vehicle tail lamp lens which is effective by refraction and internal reflection to transmit a light beam of substantially uniform density and optimum intensity through substantially all portions of the lens.

This and other objects are attained in accordance with the present invention by providing a lens with dioptric and catadioptric lens portions and forming on these portions a plurality of light dispersing flutes capable of transmitting a light beam diverging in directions of the perpendicular axes of the flutes.

Figure 1:
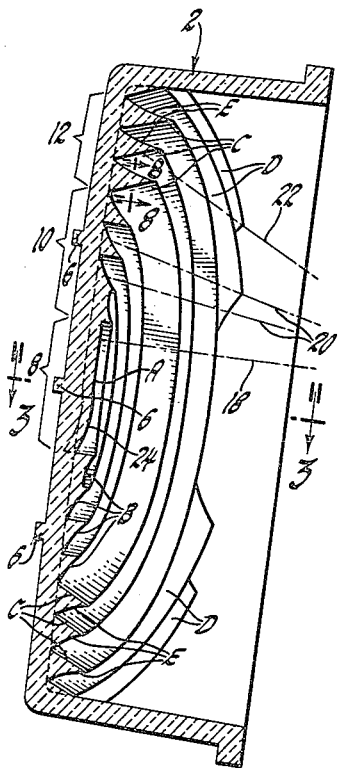
Figure 2:
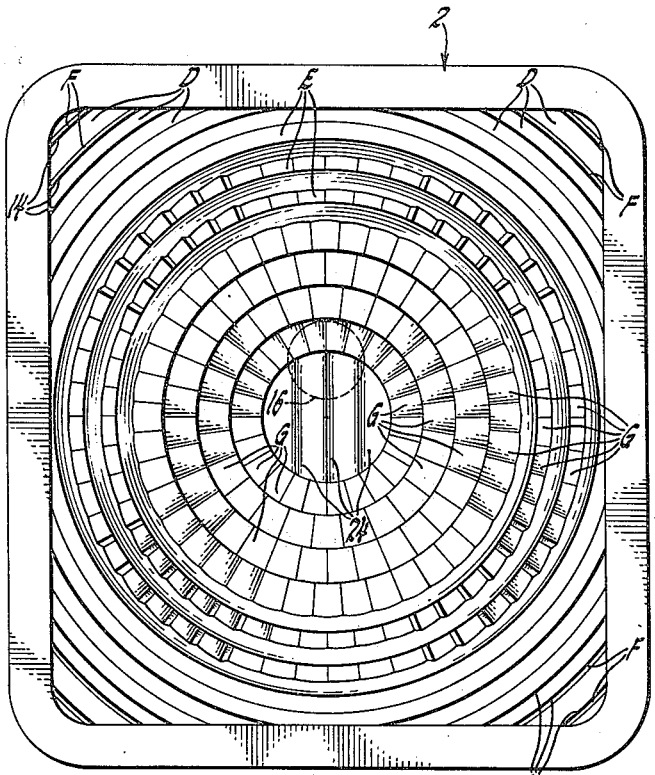
Figure 3:
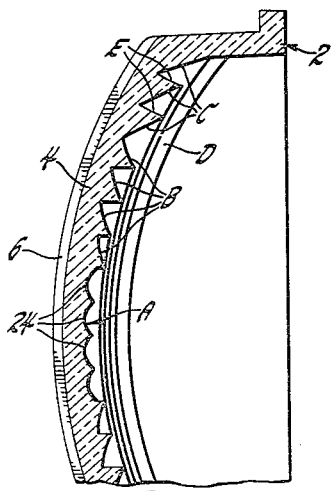
Figure 4:
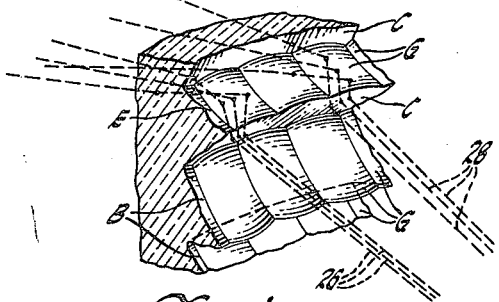

For a better understanding of the invention reference may be had to the drawings in which Figure 1 is an elevational view in cross-section of the lens of the present invention; Figure 2 is a rear view illustrated in Figure 1; Figure 3 is a view taken along the line 3—3 of Figure 1; Figure 4 is a fragmentary perspective view illustrating a catadioptric lens portion of the present invention; Figure 5 is an enlarged fragmentary view similar to Figure 2; Figure 6 is an enlarged fragmentary view taken along the line 6—6 of Figure 5; Figure 7 is an enlarged fragmentary view taken along the line 7—7 of Figure 5, and Figure 8 is an enlarged fragmentary view taken along the line 8—8 of Figure 1.

Referring now to the drawing and particularly to Figures 1, 2, 3 and 5, there is illustrated a lens 2 embodying the present invention and suitable as a tail light lens for automotive vehicles. The lens is illustrated as being substantially square with a cylindrical front face 4 having a plurality of spaced decorative ribs 6 extending across the cylindrical surface. While the lens may be made of any suitable transparent material we prefer a material such as the methyl-methacrylate thermosetting resin commonly known as "Lucite." To provide the lens with a suitable signaling color the material may be mixed with a coloring agent adapted to filter substantially all portions of the light spectra except the desired signaling color. For a tail light lens it is generally desired that the filtering color be red or of a reddish hue.

Referring now to Figures 1 and 5 the inner surface of the lens 2 is formed with a central dioptric lens portion comprising the central area indicated by the bracket 8 and the radially spaced concentric dioptric rings indicated by the bracket 10. The remainder of the surface is formed with a catadioptric lens portion comprising the radially spaced concentric catadioptric rings indicated by the bracket 12 and the radially spaced catadioptric ring segments adjacent the corners of the lens and indicated in Figures 2 and 5 by the reference character 14. The light incident surfaces of the dioptric and catadioptric lens portions comprise the surface A of the central dioptric portion; the surfaces B of the dioptric rings; the surfaces C of the catadioptric rings and the surfaces D of the catadioptric ring segments 14, see Figures 1, 2, 3 and 5. The reflecting surfaces of the catadioptric portion comprise the surfaces E of the catadioptric rings and the surfaces F of the catadioptric ring segments. A source of light 16 is indicated in dotted line in Figure 2 as being upwardly offset from the axis of the lens.

Referring now to Figure 1 it will be noted from the light ray 18, it being typical of light rays incident on the surfaces A of the central dioptric portion indicated by the bracket 8 that the light rays from the source 16 enter the central dioptric portion through the surface A where they are refracted, thereafter passing through the body and emerging through the cylindrical surface 4 where they are again refracted. Likewise, light rays 20, typical of light rays incident on the surfaces B of the dioptric ring portion indicated by bracket 10, enter the dioptric rings through the surfaces B where they are refracted, thereafter passing through the body and emerging through the cylindrical surface 4 where they are again refracted. Ray 22 being typical of light rays incident on surfaces C of the catadioptric ring portion indicated by the bracket 12, enters the catadioptric rings through the surface C where it is refracted and passes through the body of the ring where it is reflected from the surface E to continue on a path through the body of the lens emerging through the cylindrical surface 4 where it is again refracted. The dioptric ring portions and the catadioptric ring and ring segment portions follow generally the outer cylindrical contour to provide a substantially uniform thickness of the body of the lens.

To obtain a spreading of the light beam as it emerges from the lens and provide a beam of substantially uniform density, the dioptric and substantially a large portion of the catadioptric lens portions are provided with flutes. In this connection we have found that for optimum signaling conditions a beam of light emerging from such a lens has an angular divergence of substantially 40° in the horizontal plane through the axis of the lens and angular divergence of substantially 20° in the vertical plane through the axis of the lens.

We have found that these desirable signaling characteristics for a signaling beam may be obtained by providing a plurality of circumferentially adjacent flutes on the respective incident and reflecting surfaces of the radially spaced dioptric and catadioptric rings. The incident surfaces of the dioptric rings and the incident and reflecting surfaces of the catadioptric ring and ring segments may be angularly disposed with respect to the focal axis of the lens and, further, with respect to the cylindrical outer surface of the lens to provide a collimated or diverging beam consisting of rings of light. In the case where the beam is collimated, transverse flutes on the ring surfaces will provide the divergence desired. Where the beam divergence is in part obtained by the rings, further divergence may be obtained by the transverse flutes.

In addition a plurality of vertically extending flutes are provided on the surface of the dioptric lens portion indicated by the bracket 8. Referring again to Figures 1, 2, 3 and 5 the central dioptric portion indicated by bracket 8 is shown as having a surface A formed of a plurality of adjacent vertically extending concave flutes 24. As shown in Figure 1, these flutes adjacent their lower ends are curved inwardly into the body of the lens. Flutes 24 cause light rays from the source 16 to be spread in the horizontal plane through the axis of the lens and the lower portions of the flutes further cause light to be refracted upwardly in the vertical plane through the axis of the lens so that rays of light incident on the lower ends of the flute emerge from the lens and form part of the effective signaling beam. The dioptric rings indicated by the bracket 10 and the two adjacent radially spaced catadioptric rings of the group of concentric catadioptric rings indicated by the bracket 12 have provided on their respective incident surfaces B and reflecting surfaces E a plurality of circumferentially adjacent flutes G, each flute of generally the same form as those illustrated in Figure 4 being formed on the reflecting surface of one of the catadioptric rings indicated by bracket 12 in Figures 1 and 5. Figure 4 is a fragmentary view of the lens illustrating one of each of the dioptric and catadioptric rings, the uppermost being the catadioptric ring. In this view, each ring is provided with a plurality of circumferentially adjacent flutes. As shown, each flute is formed with a composite surface of curvature, this surface being convexly curved about an axis through the flute which extends substantially radially outwardly from the center of the lens and concavely curved about an axis which is perpendicular thereto and generally tangent to the rings. As shown in Figure 1 the flutes are progressively more sharply inclined to the front face of the lens from the center of the lens outwardly.

As will be seen from Figures 2 and 5, the composite flute surfaces formed on the catadioptric rings generally adjacent the lens corners are each correspondingly inclined with respect to the aforementioned axis which is generally tangent to the rings to compensate for refraction at the cylindrical surface of the lens and provide uniform divergence of the light rays passing through the lens.

Referring now to Figure 4 light rays 26 and 28 enter the incident surface C where they are refracted, and continue on paths through the catadioptric rings to the flutes G on the reflecting surface E of the catadioptric lens portions. At this surface the composite curvature of the flutes G causes the rays 26 to be internally reflected along converging paths and the rays 28 to be reflected along diverging paths. As the rays pass through the cylindrical surface 4 they are again refracted and pass in diverging paths externally of the lens to form a pyramidal beam of light. In the particular embodiment shown in Fig. 4 the composite curvature flutes are convexly curved about an axis extending substantially radially outwardly from the center of the lens and are concavely curved about an axis which is perpendicular to said first mentioned axis. However, it will be understood that the external beam divergence may be obtained with composite curvature flutes formed in other manners. For example, both component curves of the composite curvature may be concave or both may be convex. Moreover, the pyramidal beam of light caused by each flute has rays which because of their divergence become intermixed with the pyramidal beam caused by adjacent flutes to provide a beam of light of substantially uniform density and optimum intensity. Such an arrangement of flutes also gives to an observer the appearance that substantially all portions of the lens are uniformly illuminated.

While the embodiment of the present invention as herein disclosed, constitutes a preferred form, it is to be understood that other forms might be adopted, all coming within the scope of the claims which follow.

What we claim as new and desire to secure by Letters Patent of the United States is:

1. A lens comprising a body of transparent material having a cylindrical outer surface and a plurality of concentric dioptric and catadioptric lens elements on its inner surface, said elements having a plurality of light dispersing flutes formed thereon, said flutes having a composite curvature being convexly curved about one axis of said flute and concavely curved about an axis perpendicular to said first-mentioned axis, the inclination of said flutes to said cylindrical surface varying to compensate for refraction at said cylindrical surface and provide uniform divergence of light rays passing through the lens.

2. A lens comprising a body of transparent material having a cylindrical outer surface and a plurality of dioptric lens elements disposed on the inner surface, said elements including a plurality of adjacent flutes extending parallel to the axis of said outer surface and a plurality of concentric ring elements surrounding said adjacent flutes, said ring elements being provided with a plurality of circumferentially adjacent flutes of composite surface curvature being convexly curved about one axis of said flute and concavely curved about an axis perpendicular to said first-mentioned axis.

3. A lens comprising a body of transparent material having a cylindrical outer surface and a plurality of dioptric and catadioptric lens elements disposed on the inner surface, said dioptric elements including a plurality of adjacent flutes extending parallel to the axis of said outer surface and a plurality of concentric contiguous ring elements surrounding said adjacent flutes, said catadioptric elements including a plurality of contiguous concentric ring elements radially spaced from said dioptric ring elements, said first mentioned ring elements and said second mentioned ring elements having a plurality of circumferentially adjacent flutes of composite surface curvature formed thereon, said flutes being convexly curved about one axis of said flute and concavely curved about an axis perpendicular to said first-mentioned axis.

4. A lens comprising a body of transparent material having a cylindrical outer surface and a plurality of dioptric and catadioptric lens elements disposed on the inner surface, said dioptric elements including a plurality of adjacent flutes extending parallel to the axis of said outer surface and a plurality of contiguous concentric dioptric ring elements surrounding said adjacent flutes, said catadioptric elements including a plurality of concentric contiguous catadioptric ring elements surrounding said dioptric ring elements and a plurality of contiguous concentric catadioptric ring segments circumferentially spaced and surrounding said catadioptric ring elements, said dioptric and catadioptric ring elements having a plurality of circumferentially adjacent flutes of composite curvature formed thereon, said circumferentially adjacent flutes being convexly curved about one axis of said flute and concavely curved about an axis perpendicular to said last-mentioned axis with circumferentially spaced flutes on said catadioptric ring elements having their surface of composite curvature circumferentially inclined to said ring elements.

5. A lens comprising a body of transparent material having a cylindrical outer surface and a plurality of dioptric lens elements on its inner surface, said elements having a plurality of light dispersing flutes thereon, said flutes having a composite curvature being convexly curved about one axis of said flutes and concavely curved about an axis perpendicular to said first mentioned axis, both curvatures being formed on the same surface of each flute, the inclination of said flutes to said cylindrical surface varying to compensate for refraction at said cylindrical surface and to provide uniform divergence of light rays passing through the lens.

6. A lens comprising a body of transparent material having a cylindrical outer surface and a plurality of concentric catadioptric ring-like lens elements on its inner surface, said elements having a plurality of light dispersing flutes formed thereon, said flutes having a composite curvature being convexly curved about one axis of said flutes and concavely curved about an axis perpendicular to said first mentioned axis, both curvatures being formed on the same surface of each flute, the inclination of said flutes to said cylindrical surface varying to compensate for refraction at said continuously varying cylindrical surface and provide uniform divergence of light rays passing through the lens.

References Cited in the file of this patent

UNITED STATES PATENTS

| | | |
|---|---|---|
| D. 117,834 | Levy | Nov. 28, 1939 |
| 1,878,273 | Fisher et al. | Sept. 20, 1932 |
| 1,944,154 | Dickson | Jan. 23, 1934 |
| 1,955,599 | Lamblin-Parent | Apr. 17, 1934 |
| 2,290,100 | Goris | July 14, 1942 |
| 2,343,598 | Wagner | Mar. 7, 1944 |
| 2,568,494 | Geissbuhler | Sept. 18, 1951 |